May 8, 1956 — M. P. GRAHAM — 2,744,309
METHOD OF MAKING BALL STUDS
Filed Dec. 20, 1950
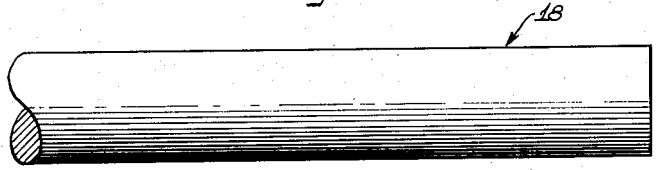
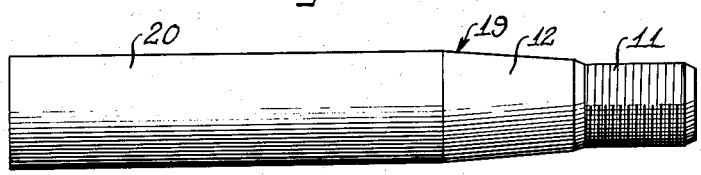
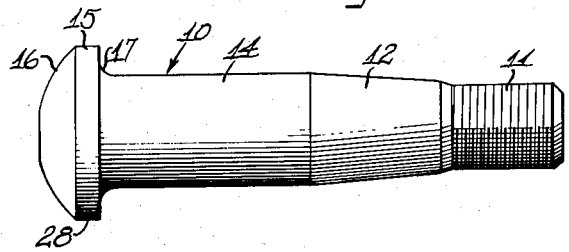
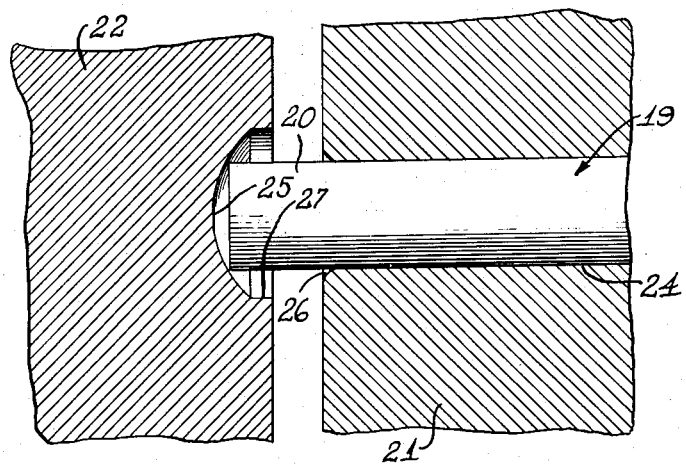
Inventor
Matthew P. Graham

United States Patent Office 2,744,309
Patented May 8, 1956

2,744,309

METHOD OF MAKING BALL STUDS

Matthew P. Graham, Detroit, Mich., assignor to Thompson Products, Inc., Cleveland, Ohio, a corporation of Ohio Application December 20, 1950, Serial No. 201,740

4 Claims. (Cl. 29—148.4)

This invention relates to a method of making headed studs with machined shanks whereby finished surfaces are obtained with a minimum loss of stock.

More specifically, the invention relates to a combined upsetting and machining method of producing ball studs for universal joints which conserves metal and produces a machine finished unit having an enlarged head, a finished cylindrical shank arm, a finished ball bearing race between the head and the adjacent cylindrical portion, a tapered shank portion at the end of the cylindrical shank portion and a threaded reduced diameter cylindrical shank portion at the small end of the tapered portion.

According to this invention ball studs are produced, by the use of a screw machine and a press, from screw machine stock of a diameter only slightly larger than the shank portion of the finished article. A threaded end and an adjacent tapered shank are formed on the end portion of the screw machine stock in the screw machine. The stock is shaved to remove surface blemishes for a sufficient distance to form a finished cylindrical shank at the large end of the tapered shank portion. The formed piece is then cut off with the shaved shank of sufficient length to allow metal for upsetting a partial ball head on the end thereof. The stock is then advanced in the machine and the operations are repeated to produce additional pieces. The screw machine finished part is then put in a press with suitable dies, and a spherical surfaced head is cold-formed on the shaved shank end. During this cold head-forming process a ball bearing race is formed between the head and the adjacent shank. Because of the smooth surface of the shaved shank and because of the nature of the cold-forming process, the finish on the ball race is very good and may be utilized without grinding.

It is, therefore, an object of the present invention to provide an expeditious method of economically producing limited quantities of ball studs without use of a cold heading machine.

Another object of this invention is to provide a method for producing bolts or ball studs from rod stock of slightly greater diameter than that of the stud shank by the use of a screw machine and a press.

A further object of the invention is to provide an economical method of forming bolts or ball studs from rod stock of a diameter slightly larger than that of the shank of the finished piece by forming the threaded end and the tapered and cylindrical shanks on a screw machine and by cold upsetting a head by means of a press.

A specific object of this invention is to provide a method of forming ball studs by finishing the threaded end, the tapered shank and the cylindrical shank on a screw machine from stock of slightly greater diameter than that of the finished cylindrical shank and by subsequently forming a spherical ended head at the cylindrical shank end of the stud having a finished ball bearing race formed between the head and the adjacent shank.

Other and further objects of the invention will become readily apparent from the following detailed description of one embodiment as shown in the accompanying sheet of drawings, by way of preferred example only, in which:

On the drawings:

Figure 1 is a fragmentary view of a length of screw machine metal rod stock for forming ball studs according to the present invention;

Figure 2 is a longitudinal elevational view of a machined blank before the head is formed thereon;

Figure 3 is a longitudinal elevational view of a finished ball stud according to the present invention; and Figure 4 is a fragmentary sectional view of the head forming dies with a machined blank shown in elevation and in position for forming a ball head.

As shown on the drawings:

One embodiment of a finished article which may be produced according to the method of the present invention is illustrated in Figure 3 in the form of a ball stud 10. One end of the stud 10 has an externally threaded portion 11. Adjacent the threaded portion 11 is an integral coaxial tapered shank portion 12 adapted for inserting into a mating tapered hole in a connecting member (not shown) to be held therein by a nut (not shown) threaded on the threaded portion 11. Adjacent the tapered shank portion 12 is a cylindrical shank portion 14 coaxial with the portions 11 and 12 and integral therewith. The cylindrical shank portion 14 may be utilized as a longitudinal bearing surface in a ball joint or the like.

At the end of the ball stud opposite to the threaded portion 11 is formed a partial ball head 15 of larger diameter than the shank 14 and having a segmental spherical end surface 16. Between the head 15 and the cylindrical shank portion 14 is formed a concave rounded ball bearing race 17.

The ball stud of Figure 3 is expeditiously and economically formed from a solid steel rod 18 (Fig. 1) of screw machine stock or the like having a slightly larger diameter than that of the finished cylindrical shank portion 14. A length of the rod stock 18 is inserted into a screw machine set up for forming a screw machine finished blank 19 as shown in Figure 2. With the screw machine in operation the threaded and tapered portions 11 and 12 are machined on the inserted end portion of the stock length 18. A portion of the stock adjacent the large end of the tapered shank portion 12 is shaved by the screw machine to form a cylindrical section 20 of a diameter equal to that of the finished cylindrical shank 14 and of sufficient length to provide for the cylindrical shank and for the formation of the head 15 at the end thereof. The shaving operation is sufficient to cut off all surface folds and faults and should be at least to a depth of .010 to .015 inch. The machined rod section is then cut off from the rest of the rod 18 at the end of the shaved section 20 to provide a finished blank 19.

The screw machine finished blank 19 is then placed into a press containing forming dies, such as the bell mouth or bevel mouth die 21 and the punch die 22 (Fig. 4), for forming the head 15 with the segmental spherical surface 16 and the ball bearing race 17. The cylindrical section 20 is firmly held in a cylindrical bore 24 in the die 21 with a sufficient portion of the end extending out of the die to permit the formation of a head. The punch die 22 is then moved axially against the free end portion of the cylindrical section 20 and forces the metal of the end into conforming shape in a segmental spherical recess 25 in the face of the punch die. As the metal of the end portion of the cylindrical section forms to the shape of the spherical recess 25, the metal adjacent the opening of the bore 24 is forced into conforming contact with an annular bell mouth or bevel mouth entrance 26 of the die 21. The spherical recess 25 is formed with a cylindrical rim 27 to assist in the even formation of the head and to guide the head as it is formed in order to insure the formation of a perfectly annular and smooth ball bearing race. A consequent cylindrical rim 28 is formed on the finished head 15.

The resultant surface of the ball bearing race 17 is of high enough quality to preclude the necessity of grinding. It will be readily understood that this elimination of an extra grinding operation on the ball bearing race 17, due to the previous surface-shaving of the shank and the nature of the cold upsetting operation, will materially decrease the cost of the finished product. It will also be readily understood that the formation of the head without the necessity of using screw machine stock of slightly greater diameter than the head itself provides a great saving in material and time.

From the foregoing description it will be understood that this invention provides an inexpensive and expeditious method of producing ball studs or bolts. The method according to the present invention allows the formation of the finished stud from screw machine stock of slightly larger diameter than that of the cylindrical shank and the surface of the ball bearing race adjacent the head is sufficiently smooth and accurate for use without grinding for most applications.

It will be understood that modifications and variations may be effected without departing from the scope of the novel concepts of the present invention.

I claim as my invention:

1. The method of forming a ball stud or the like comprising machining a rod to form external threads of reduced diameter on the end of the rod, contemporaneously forming a tapered shank portion adjacent said threaded portion and tapering radially outwardly from substantially the diameter of the threaded portion to the diameter of the unmachined rod, shaving a portion of said rod adjacent the large end of said tapered shank portion to form a machined cylindrical shank portion free from surface blemishes, cutting off the machined end portion of said rod stock length to form a blank including said threaded end, said tapered shank and said shaved cylindrical shank, inserting the cylindrical end portion of said blank in a bevel-mouthed die, and cold forming a rounded head on the end of the blank while forcing a shaved portion of the blank against the beveled mouth of said die to expand the metal of said shaved portion abruptly radially outwardly to form a finished annular, radially outwardly curved ball bearing race between the head and the adjacent shank portion.

2. The method of forming a stud from a length of rod stock which comprises forming an externally threaded end portion of substantially smaller diameter than the rod stock, contemporaneously forming a tapered shank portion adjacent said threaded portion and tapering outwardly therefrom, shaving the surface of a portion of the rod stock adjacent said tapered shank portion to remove surface blemishes therefrom and to form a cylindrical shank portion, and cold forming a finished head at the end of the cylindrical shank portion having an annular radially extending bearing surface on said head and said shank at the junction between said head and said shank and which is free from surface blemishes.

3. A method for forming a ball stud which comprises machining a rod to form a reduced diameter threaded end portion and an adjacent tapered shank portion diverging therefrom, shaving a length of the rod adjacent the large diameter end of the tapered shank portion to remove from the surface of the rod surface blemishes and faults, cutting the machined and shaved portion of the rod from the remaining portion of the rod to provide a blank, inserting the resulting blank in a die with a portion of the shaved portion of the blank projecting beyond a beveled mouth of the die, impacting a spherically recessed end of a die against the projecting end of the blank to upset an enlarged fragmental spherical head on the end of the blank while simultaneously forcing a shaved portion of the blank against the beveled mouth to form a radially outwardly expanded annular peripheral shoulder having an arcuate fillet at the juncture between said shoulder and said shank to provide a ball bearing race without further finishing.

4. The method of making a ball joint stud having cylindrical portion, an annular radially outwardly directed concave ball race forming external peripheral shoulder at the end of the cylindrical portion, and a fragmental spherical ball head depending from the periphery of said shoulder, which comprises providing a solid metal rod having a diameter less than said ball head and greater than said cylindrical portion, shaving a length of the rod to cut off surface folds and faults to a depth of at least .01 inch, cutting the shaved portion of the rod from the remainder of the rod to form a blank, placing the blank in a die having an annular convexly beveled mouth, positioning the blank in said die with the end portion of the shaved part projecting beyond the beveled mouth, seating the projecting end of said blank in a segmental spherical recess of a second die, and forcing the dies toward each other to simultaneously form the enlarged, depending ball head and the expanded arcuate ball-race-forming external peripheral shoulder thereby producing the stud with finished surfaces without further machining.

References Cited in the file of this patent

UNITED STATES PATENTS

| | | |
|---|---|---|
| 986,697 | Deeds | Mar. 14, 1911 |
| 1,096,555 | Muller | May 12, 1914 |
| 1,701,736 | Timken | Feb. 12, 1929 |
| 1,784,866 | Fahrenwald | Dec. 16, 1930 |
| 2,005,547 | Johnson | June 18, 1935 |
| 2,106,567 | Hufferd | Jan. 25, 1938 |
| 2,141,753 | Hufferd | Dec. 27, 1938 |
| 2,265,839 | Hufferd | Dec. 9, 1941 |